(12) United States Patent
Buskens et al.

(10) Patent No.: US 8,181,162 B2
(45) Date of Patent: May 15, 2012

(54) MANAGER COMPONENT FOR CHECKPOINT PROCEDURES

(75) Inventors: Richard W. Buskens, Robbinsville, NJ (US); Oscar J. Gonzalez, Bridgewater, NJ (US); Yow-Jian Lin, Edison, NJ (US)

(73) Assignee: Alcatel Lucent, Paris (FR)

( * ) Notice: Subject to any disclaimer, the term of this patent is extended or adjusted under 35 U.S.C. 154(b) by 580 days.

(21) Appl. No.: 10/868,127

(22) Filed: Jun. 14, 2004

(65) Prior Publication Data

US 2005/0278699 A1 Dec. 15, 2005

(51) Int. Cl.
*G06F 9/44* (2006.01)

(52) U.S. Cl. ........ 717/130; 717/101; 717/124; 717/128; 717/129; 714/13; 719/328; 719/329; 719/330

(58) Field of Classification Search ................ 717/102, 717/103, 127, 128, 130; 714/13; 719/328, 719/329, 330
See application file for complete search history.

(56) References Cited

U.S. PATENT DOCUMENTS

| | | | | | |
|---|---|---|---|---|---|
| 5,590,277 | A | * | 12/1996 | Fuchs et al. | 714/38 |
| 5,630,047 | A | * | 5/1997 | Wang | 714/15 |
| 5,845,292 | A | * | 12/1998 | Bohannon et al. | 707/202 |
| 5,923,832 | A | * | 7/1999 | Shirakihara et al. | 714/37 |
| 5,958,070 | A | * | 9/1999 | Stiffler | 714/13 |
| 6,044,475 | A | * | 3/2000 | Chung et al. | 714/15 |
| 6,105,148 | A | * | 8/2000 | Chung et al. | 714/16 |
| 6,145,094 | A | * | 11/2000 | Shirriff et al. | 714/11 |
| 6,154,877 | A | * | 11/2000 | Ramkumar et al. | 717/114 |
| 6,161,193 | A | * | 12/2000 | Garg et al. | 714/6 |
| 6,185,702 | B1 | * | 2/2001 | Shirakihara et al. | 714/38 |
| 6,332,200 | B1 | * | 12/2001 | Meth et al. | 714/16 |
| 6,594,779 | B1 | * | 7/2003 | Chandra et al. | 714/15 |
| 6,708,288 | B1 | * | 3/2004 | Ziegler et al. | 714/15 |
| 6,789,114 | B1 | * | 9/2004 | Garg et al. | 709/224 |
| 6,823,474 | B2 | * | 11/2004 | Kampe et al. | 714/13 |
| 6,874,138 | B1 | * | 3/2005 | Ziegler et al. | 717/127 |
| 2001/0037326 | A1 | * | 11/2001 | Bamford et al. | 707/1 |
| 2002/0032883 | A1 | * | 3/2002 | Kampe et al. | 714/16 |

OTHER PUBLICATIONS

Cristian, F. , Jahanianm F. . "A Timestamp-based checkpointing protocol for long-lived distributed computations." Reliable Distributed Systems 10(1991): 12-20.*
Lucent Technologies Inc., "Statement Disclosing Information About Development and Use of Technology", 2002 to 2004, 3 pgs., Murray Hill, NJ, USA.

* cited by examiner

*Primary Examiner* — Anna Deng
*Assistant Examiner* — Matthew Brophy
(74) *Attorney, Agent, or Firm* — Carmen Patti Law Group, LLC

(57) ABSTRACT

A manager component of an apparatus in one example handles one or more checkpoint procedures for one or more software components of a distributed software application that runs within a plurality of executables.

18 Claims, 1 Drawing Sheet

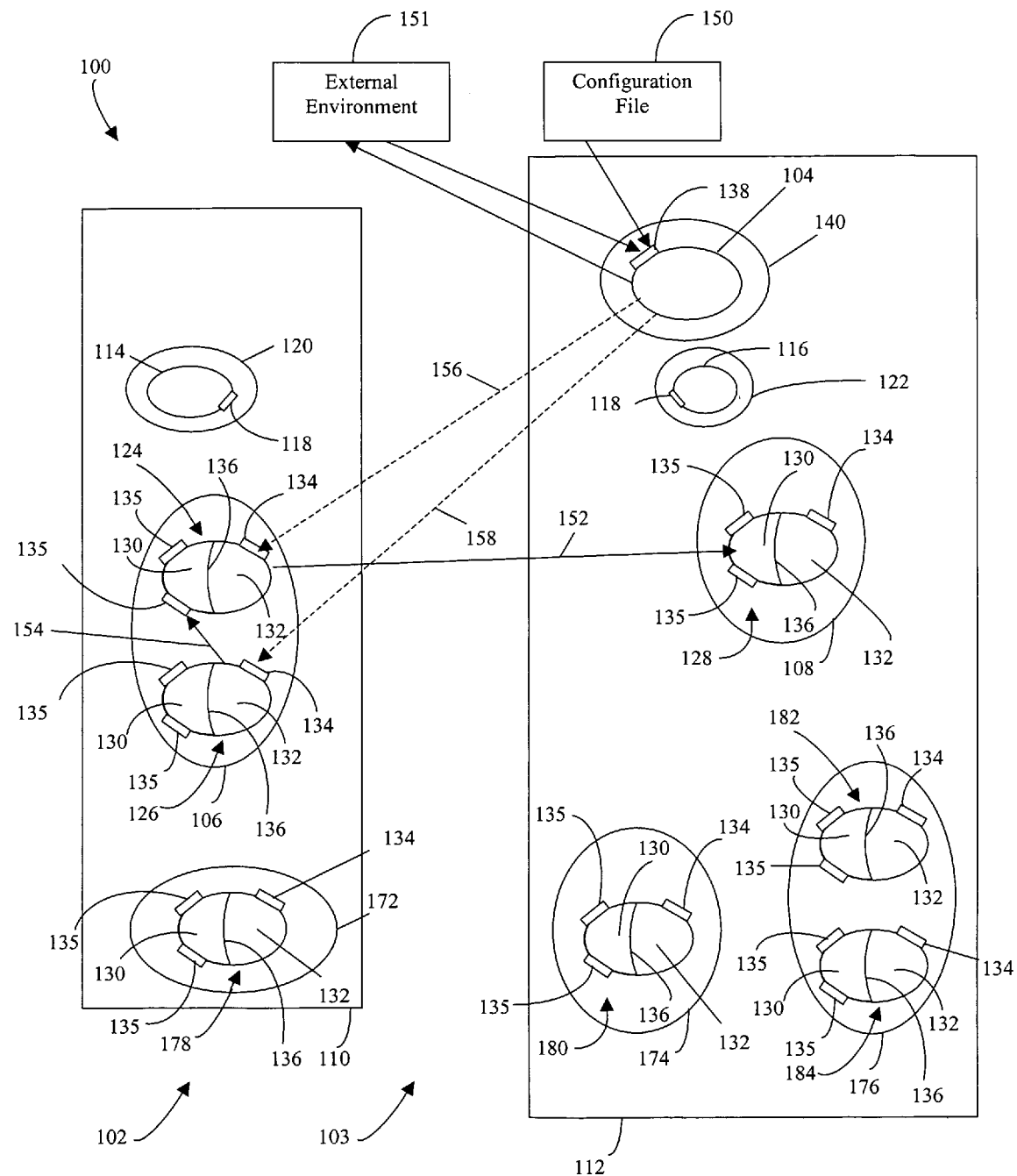

MANAGER COMPONENT FOR CHECKPOINT PROCEDURES

CROSS-REFERENCE TO RELATED APPLICATIONS

This application contains subject matter that is related to the subject matter of the following applications, which are assigned to the same assignee as this application. The below-listed applications are hereby incorporated herein by reference in their entireties.

"INSTRUCTING MANAGEMENT SUPPORT SOFTWARE OF A FIRST SOFTWARE COMPONENT TO SET UP A COMMUNICATION CHANNEL BETWEEN THE FIRST SOFTWARE COMPONENT AND A SECOND SOFTWARE COMPONENT," by Buskens, et al., co-filed herewith;

"SELECTING A PROCESSOR TO RUN AN EXECUTABLE OF A DISTRIBUTED SOFTWARE APPLICATION UPON STARTUP OF THE DISTRIBUTED SOFTWARE APPLICATION," by Buskens, et al., co-filed herewith;

"SOFTWARE COMPONENT INITIALIZATION IN AN ORDERED SEQUENCE," by Buskens, et al., co-filed herewith;

"SHUTTING DOWN A PLURALITY OF SOFTWARE COMPONENTS IN AN ORDERED SEQUENCE," by Buskens, et al., co-filed herewith;

"DISTRIBUTED SOFTWARE APPLICATION SOFTWARE COMPONENT RECOVERY IN AN ORDERED SEQUENCE," by Buskens, et al., co-filed herewith;

"MANAGER COMPONENT THAT CAUSES FIRST SOFTWARE COMPONENT TO OBTAIN INFORMATION FROM SECOND SOFTWARE COMPONENT," by Buskens, et al., co-filed herewith;

"FIRST AND SECOND MANAGER COMPONENTS THAT COMMUNICATE TO INITIALIZE AND/OR SHUT DOWN SOFTWARE COMPONENTS IN AN ORDERED SEQUENCE," by Buskens, et al., co-filed herewith;

"MANAGER COMPONENT RESOURCE ADDITION AND/OR RESOURCE REMOVAL ON BEHALF OF DISTRIBUTED SOFTWARE APPLICATION," by Gong, et al., co-filed herewith;

"SUBSTITUTE MANAGER COMPONENT THAT OBTAINS STATE INFORMATION OF ONE OR MORE SOFTWARE COMPONENTS UPON FAILURE OF A FIRST MANAGER COMPONENT," by Buskens, et al., co-filed herewith.

TECHNICAL FIELD

The invention relates generally to distributed software applications and more particularly to management of distributed software applications.

BACKGROUND

In known distributed software applications, software components are distributed among a plurality of executables (i.e., software capsules or software entities). Each of the executables contains one or more software components that perform some portion of the functionality of the distributed software application. The software components often store state information, for example, a checkpoint, to reduce recovery time of a failed software component. In known distributed software applications, the software components individually manage checkpoints and their associated checkpoint procedures.

As one shortcoming, the software developer must create extra software within the first and second executables to perform the checkpoint procedures. Thus, a need exists to alleviate software components of the responsibility of handling checkpoint procedures.

SUMMARY

In one embodiment, there is provided an apparatus comprising a manager component, for a distributed software application, that handles one or more checkpoint procedures for one or more software components of a distributed software application that runs within a plurality of executables.

In another embodiment, there is provided a method for establishing a communication channel for a software component of a distributed software application between the software component and a checkpoint destination; receiving a checkpoint with state information from the software component; and sending the checkpoint to the checkpoint destination through employment of the communication channel.

In yet another embodiment, there is provided an apparatus comprising a high availability manager component of a high availability infrastructure for a distributed software application that comprises a plurality of software components. One software component of the plurality of software components comprises application software and management support software. The application software performs a portion of functionality of the distributed software application. The management support software comprises a portion of the high availability infrastructure. The high availability manager component and the management support software cooperate to handle one or more checkpoint procedures for the one software component of the plurality of software components.

DESCRIPTION OF THE DRAWINGS

Features of exemplary implementations of the invention will become apparent from the description, the claims, and the accompanying drawings in which:

FIG. 1 is a representation of an exemplary implementation of an apparatus that comprises a distributed software application and a management infrastructure.

DETAILED DESCRIPTION

Turning to FIG. 1, an apparatus 100 in one example comprises a distributed software application 102 and one or more management infrastructures 103. The distributed software application 102 represents a software application divided among a plurality of executables (i.e., software capsules or software entities). For example, the distributed software application 102 comprises a plurality of executables 106, 108, 172, 174 and 176. The distributed software application 102 may run on a single central processing unit ("CPU") or may be divided between multiple CPUs. For example, the executable 106 may run on a processor 110 and the executable 108 may run on a processor 112.

The executables 106, 108, 172, 174 and 176 comprise one or more software components 124, 126, 128, 178, 180, 182 and 184 of the distributed software application 102, as described herein. For example, the executable 106 encapsulates the software components 124 and 126 and the executable 108 encapsulates the software component 128. Within each of the executables 106, 108, 172, 174 and 176 may be tens, hundreds, or even thousands of other software components (e.g., analogous to the software components 124, 126, 128, 178, 180, 182 and 184).

The distributed software application 102 comprises a plurality of software components, for example, the software components 124, 126, 128, 178, 180, 182 and 184. The software components 124, 126, 128, 178, 180, 182 and 184 represent software sub-entities of the executables 106, 108, 172, 174 and 176. For example, the software components 124, 126, 128, 178, 180, 182 and 184 represent logical software blocks and/or software objects. The software components 124 and 126 in one example are developed independently and then put together within the executable 106. For example, the software components 124 and 126 are compiled into the executable 106. The distributed software application 102 may provide any functionality for a computer system. The distributed software application 102 in one example comprises a call processing software application. For example, the distributed software application 102 sets up and/or tears down telecommunication sessions in a telecommunication network.

The management infrastructure 103 performs one or more management procedures for the distributed software application 102. For example, the management infrastructure 103 provides a reusable software framework for one or more management procedures. For example, the management infrastructure 103 handles one or more of starting, stopping, initializing, and monitoring the distributed software application 102, detecting failures of the distributed software application 102, recovering the distributed software application 102, propagating state changes about the distributed software application 102, establishing communication channels between the software components 124, 126, 128, 178, 180, 182 and 184, and the like.

The management infrastructure 103 in one example comprises one or more manager components 104, one or more executable managers 114 and 116 and/or one or more management support components 132. The management infrastructure 103 may run on one or more of the processors 110, 112, and/or a remote processor (not shown). The manager component 104 in one example handles startup, shutdown, initialization, failure detection, recovery, and other functions for the distributed software application 102, as will be appreciated by those skilled in the art.

One or more of the components of the management infrastructure 103, for example, the manager component 104, the executable managers 114 and 116, and the management support software 132 of the software components 124, 126, 128, 178, 180, 182 and/or 184, in one example detect one or more failures and/or faults of the distributed software application 102 and/or the management infrastructure 103. In one example, the software component 124 of the distributed software application 102 returns a response to the manager component 104 during initialization that indicates an error. In another example, the manager component 104 employs a timer to determine a timeout for a message response. For example, the manager component 104 determines an error has occurred if it has not received a message response from the software component 124 within a pre-determined time interval, for example, thirty seconds. The components of the management infrastructure 103 in one example communicate through employment of a fault-tolerant and/or redundant messaging protocol. For example, the fault-tolerant messaging protocol comprises handshake procedures, delivery confirmations, message timeouts, fault detection procedures, and fault escalation procedures, as will be appreciated by those skilled in the art.

The manager component 104 comprises a communication interface 138 for receiving incoming communications. The communication interface 138 is employable for receiving a configuration file 150 for the distributed software application 102. The manager component 104 may employ other means to receive the configuration file 150, such as reading the configuration file 150 directly from a disk or file system. The manager component 104 may also use the communication interface 138 for receipt of external system information from an external environment 151. The external environment 151 in one example represents other components of the system that are in communication with the manager component 104. The communication interface 138 may also receive communications from the executable managers 114 and 116, as well as communications from the software components 124, 126, 128, 178, 180, 182 and 184. The manager component 104 is encapsulated with zero or more other software components in an executable 140. The executable 140 that contains the manager component 104 may be run on either of the processors 110 and 112.

The manager component 104 in one example establishes one or more communication channels between the software components 124, 126, 128, 178, 180, 182 and 184. In one example, the manager component 104 establishes a communication channel 152 between the software component 124 and the software component 128. In another example, the manager component 104 establishes a communication channel 154 between the software component 126 and the software component 124. The manager component 104 sends one or more messages, for example, the messages 156 and 158, to the management support software 130 of the software components 124 and 126, respectively, to establish the communication channels 152 and 154.

The executable managers 114 and 116 comprise a communication interface 118 for communication with the manager component 104. The executable managers 114 and 116 in one example receive instruction from the manager component 104. For example, the executable managers 114 and 116 may receive instructions at the communication interface 118 from the manager component 104. The executable managers 114 and 116 in one example are encapsulated in an executable 120 and an executable 122, respectively.

The executable managers 114 and 116 monitor executables and/or software components of the distributed software application 102 that run on the processors 110 and 112, such as the executables 106, 108, 172, 174 and 176 and the software components 124, 126, 128, 178, 180, 182 and/or 184. For example, the executable managers 114 and 116 monitor communication channels and/or diagnostics on behalf of the executables 106, 108, 172, 174 and 176, and the software components 124, 126, 128, 178, 180, 182 and 184. Should one or more of the executables 106, 108, 172, 174 and 176 and/or the software components 124, 126, 128, 178, 180, 182 and 184 fail, the respective executable manager informs the manager component 104 of the failure.

In one example, the management infrastructure 103 comprises one executable manager per processor. For example, the executable 120 of the executable manager 114 runs on the processor 110. The executable manager 114 monitors the executables 106 and 172 and the software components 124, 126 and 178. The executable 122 of the executable manager 116 runs on the processor 112. The executable manager 116 monitors the executables 108, 174 and 176 and the software components 128, 180, 182 and 184.

Each of the software components 124, 126, 128, 178, 180, 182 and 184 comprise application software 130, management support software 132, a management support software communication interface 134, and one or more application software communication interfaces 135. The software components 124, 126, 128, 178, 180, 182 and 184 employ the management support software communication interface 134 to receive communications from the manager component 104. The software components 124, 126, 128, 178, 180, 182 and 184 employ the application software communication interfaces 135 to receive communications from other software components of the software components 124, 126, 128, 178, 180, 182 and 184. An application programming interface ("API") 136 communicatively couples the application software 130 with the management support software 132 in each of the software components 124, 126, 128, 178, 180, 182 and 184. The application software 130 and the management support software 132 can exchange information through the application programming interface 136. The manager component 104 in one example generates the application programming interface 136 through employment of a code generator.

The software components 124, 126, 128, 178, 180, 182 and 184 each perform some portion of the overall functionality of the distributed software application 102. The software components 124, 126, 128, 178, 180, 182 and 184 work together to make the distributed software application 102 achieve the desired operation. For example, the software components 124, 126, 128, 178, 180, 182 and 184 process incoming requests from each other and perform operations to provide the overall functionality.

An application developer creates the application software 130 of the software components 124, 126, 128, 178, 180, 182 and 184 to perform the designated functionality of the software components 124, 126, 128, 178, 180, 182 and 184. For example, the application developer creates the application software 130 of the software components 124, 126, 128, 178, 180, 182 and 184 to achieve the overall functionality of the distributed software application 102. The management support software 132 of the software components 124, 126, 128, 178, 180, 182 and 184 communicatively couples the software components 124, 126, 128, 178, 180, 182 and 184 to allow the application software 130 to perform the functionality of the distributed software application 102.

To alleviate the application developers from being required to write software into each of the software components 124, 126, 128, 178, 180, 182 and 184 for the management procedures, the manager component 104, the executable managers 114 and 116, and the management support software 132 cooperate to perform the management procedures for the software components 124, 126, 128, 178, 180, 182 and 184. A code generator of the management infrastructure 103 in one example automatically generates the management support software 132. The code generator of the management infrastructure 103 employs the configuration file 150 to create the management support software 132. For example, the configuration file 150 comprises connection information and/or architecture information of the distributed software application 102. The code generator creates code for the management support software 132. The code for the management support software 132 is compiled and linked with the application software 130 in the software components 124, 126, 128, 178, 180, 182 and 184. The management support software 132 may be different for each of the software components 124, 126, 128, 178, 180, 182 and 184, as will be appreciated by those skilled in the art.

One or more of the manager component 104, the executable managers 114 and 116, and/or the software components 124, 126, 128, 178, 182, 184 and 180 in one example comprise a portion of an active/standby group. Each active/standby group comprises a first component (i.e. active component) and a second component (i.e. standby component). The first component performs a portion of the overall functionality of the distributed software application 102 or the management infrastructure 103 while the second components remain inactive. Upon a failure of the first component, the second component is promoted to an active status. For example, the standby component becomes an active component and begins to perform the portion of the overall functionality. The standby component provides a redundancy in operation of the distributed software application 102 and/or the management infrastructure 103. The active/standby group promotes a reduction in downtime for the distributed software application 102 and/or the management infrastructure 103, as will be appreciated by those skilled in the art.

Checkpoint procedures comprise procedures for storing state information of software components. State information is stored as a checkpoint for later use, for example, recovery or initialization of a software component to a known state, as will be understood by those skilled in the art. The manager component 104 in one example handles one or more checkpoint procedures for one or more of the software components 124, 126, and/or 128. For example, the manager component 104 starts, manages, and maintains the checkpoint procedures for the software components 124, 126 and/or 128. Since the manager component 104 handles the checkpoint procedures, the application software 130 does not require resources for management of the communication channel or the checkpoint destination. For example, the destination is transparent to the application software 130, as will be appreciated by those skilled in the art.

Under the direction of the manager component 104, the management support software 132 receives notification about the destination for checkpoints from the application software 130 and sets up a communication channel for checkpoints to the pre-determined destination. The checkpoint may comprise a complete set of state information of a software component, or only a portion of the state information, for example, an incremental checkpoint. Exemplary destinations comprise memory, disk storage arrays, databases, other software components, and console displays. The management support software 132 in one example uses a null destination, for example, to indicate that the checkpoint should be discarded. The checkpoint is discarded if the checkpoint is not needed, or if no destination is available to store it. The management support software 132 provides a function call interface to the application software 130 to handle the checkpoint procedures. Exemplary functions save the checkpoints, delete the checkpoints, get the destination, and set the destination, as will be appreciated by those skilled in the art.

Referring to FIG. 1, an illustrative description of exemplary operation of the apparatus 100 is presented, for explanatory purposes. The manager component 104 causes a startup of the software component 124. Upon the startup, the manager component 104 makes a determination that the software component 124 comprises a checkpoint relationship. The manager component 104 makes the determination based on the configuration file 150. The configuration file 150 in one example describes a checkpoint relationship between the software component 124 and the software component 128 where the software component 124 sends checkpoint data to the software component 128. For example, the software component 128 comprises a destination for a checkpoint from the software component 124. The manager component 104 causes a startup of the software component 128 such that the software component 128 can receive the checkpoint data from the software component 124. For example, the manager component 104 causes the startup of the software component 128 after the startup of the software component 124.

Upon the startup of the software component 128, the manager component 104 establishes a communication channel 152 from the management support software 132 of the software component 124 to the software component 128 through application interface 135. For example, the manager component 104 sends a message to the management support software 132 of the software component 124. The message comprises an object reference to application interface 135 of the software component 128. The management support software 132 of the software component 124 employs the object reference to the application interface 135 of software component 128 to establish the communication channel 152 with the software component 128. In one example, the management support software 132 of the software component 124 establishes the communication channel 152 with the application software 130 of the software component 128 through application interface 135. In another example, the management support software 132 of the software component 124 establishes the communication channel 152 with the management support software 132 of the software component 128. For example, the software components 124 and 128 comprise an active/standby group, as will be appreciated by those skilled in the art.

During operation of the software component 124, the application software 130 of the software component 124 performs a checkpoint procedure. The application software 130 in one example determines a start of the checkpoint procedure, for example, based on a timer expiration and/or an occurrence of a pre-determined event. In another example, the management support software 132 requests a start of the checkpoint procedure. The application software 130 identifies state information to be checkpointed and passes the state information to the management support software 132. The application software 130 employs the application programming interface 136, for example, a function call to a "dump" procedure, to pass the state information to the management support software 132.

The application programming interface 136 of the software component 124 in one example employs one or more parameters to perform the dump procedure. Exemplary parameters comprise a key, data, and a logical timestamp. A checkpoint in one example comprises the key, the data, and the logical timestamp. The key corresponds to an identifier for the state information to be checkpointed. For example, where the application software 130 checkpoints a plurality of distinct portions of state information, the key serves to identify which distinct portion is currently being checkpointed. The key in one example comprises a data structure identifier. The data corresponds to the state information that is being checkpointed. The logical timestamp serves to provide a sequential and/or chronological ordering for multiple checkpoints. For example, a checkpoint with an earlier timestamp may be overwritten with a checkpoint with a later timestamp. The key and the logical timestamp uniquely identify the state information for each checkpoint, as will be appreciate by those skilled in the art.

Upon receipt of the state information, the management support software 132 of the software component 124 in one example sends the checkpoint to the software component 128. For example, the management support software 132 sends one or more messages that comprise the checkpoint over the communication channel 152 to the software component 128. In one example, the management support software 132 of the software component 128 receives the checkpoint. The management support software 132 passes the checkpoint to the application software 130 of the software component 128 through employment of the application programming interface 136. The software component 128 employs the checkpoint to promote redundancy of the state information within the checkpoint, as will be appreciated by those skilled in the art.

The manager component 104 and/or the management support software 132 of the software component 124 in one example manage the checkpoint procedures for the software component 124. In one example, the manager component 104 and the management support software 132 cooperate to validate the communication channel 152 between the software component 124 and the software component 128. In another example, the manager component 104 sends to the software component 128 an indication that a checkpoint is valid.

The manager component 104 in one example changes the destination of the checkpoint for the software component 124 while the software component 124 is operational. The manager component 104 sends a message to the management support software 132 of the software component 124 to change the destination. In one example, the manager component 104 changes the destination upon a change in priority of the software component 124. For example, the manager component 104 changes the destination upon an escalation of the software component 124 from a standby component to an active component of an active/standby group. In another example, the manager component 104 changes the destination upon a fault detection and/or failure of the software component 128. The application software 130 of the software component 124 continues operation while the management support software 132 of the software component 124 changes the destination, as will be appreciated by those skilled in the art.

The apparatus 100 in one example comprises a plurality of components such as one or more of electronic components, hardware components, and computer software components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art.

The apparatus 100 in one example employs one or more computer-readable media. The computer-readable media store software, firmware and/or assembly language for performing one or more portions of one or more embodiments of the invention. Examples of a computer-readable medium for the apparatus 100 comprise recordable data storage media of the management infrastructure 103. The computer-readable medium for the apparatus 100 in one example comprise one or more of a magnetic data storage medium, electrical data storage medium, optical data storage medium, biological data storage medium, and atomic data storage medium. For example, the computer-readable medium comprise floppy disks, magnetic tapes, CD-ROMs, DVD-ROMs, hard disk drives, and electronic memory. In another example, the computer-readable medium comprises a network. The network comprises or is coupled with the apparatus 100, for instance, one or more of a telephone network, a local area network ("LAN"), a wide area network ("WAN"), the Internet, and a wireless network.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. A computer-readable medium that comprises one or more of a floppy disk, magnetic tape, CD-ROM, DVD-ROM, hard disk drive, or electronic memory that stores a software program for implementation of:
   a management infrastructure for a distributed software application, wherein the distributed software application comprises one or more software components, each comprising application software and management support software, that run within a plurality of executables;
   wherein the management infrastructure comprises:
   a manager component configured to establish communication channels between software components, said communication channels used for handling one or more checkpoint procedures for the software components;
   a plurality of executable managers for monitoring diagnostics for the plurality of executables;
   management support software communication interfaces, associated with each management support software, for receiving messages from the manager component to establish a communication channel with another software component;
   an application programming interface between the management support software and the application software in each software component;
   a configuration file comprising information about checkpoint relationships between the one or more software components, said configuration file used by the manager component to send a message to at least the management support software of a first software component to establish a communication channel with a second software component such that the checkpoint relationship indicates that the second software component is a checkpoint destination for the first software component; and
   a code generator, within the management infrastructure, for generating, compiling, and linking code for the management support software based at least on the checkpoint relationship information in the configuration file, wherein the generated code comprises the application programming interface and includes at least a function call interface of the checkpoint procedures for communication between the application software and the management support software in each software component.

2. The computer-readable medium of claim 1, wherein the one application software is communicatively coupled with the one management support software;
   wherein the one management support software cooperates with the manager component to perform one checkpoint procedure of the one or more checkpoint procedures.

3. The computer-readable medium of claim 2, wherein the checkpoint comprises one or more state information portions of the application software;
   wherein the manager component employs the state information to recover and/or initialize another software component.

4. The computer-readable medium of claim 3, wherein the checkpoint comprises a full checkpoint or an incremental checkpoint.

5. The computer-readable medium of claim 3, wherein the checkpoint comprises a key, the state information, and a logical timestamp for the checkpoint;
   wherein the key and the logical timestamp comprise a unique identifier for the checkpoint.

6. The computer-readable medium of claim 3, wherein the application software makes a determination of the state information portion for the checkpoint.

7. The computer-readable medium of claim 2, wherein the application software makes a determination to start the checkpoint procedure;
   wherein, upon the determination to start the checkpoint procedure, the application software creates the checkpoint and sends the checkpoint to the management support software component through employment of the application programming interface.

8. The computer-readable medium of claim 7,
   wherein the function call interface comprises functions for the application software to one or more of save the checkpoint, delete the checkpoint, retrieve a destination for the checkpoint, and set the destination for the checkpoint.

9. The computer-readable medium of claim 7, wherein the manager component generates the application programming interface upon compilation of the distributed software application through employment of the code generator.

10. The computer-readable medium of claim 7, wherein the application software makes the determination to start the checkpoint procedure based on one or more of an occurrence of a pre-determined event and/or an expiration of a timer.

11. The computer-readable medium of claim 7, wherein the manager component and the management support software cooperate to update a an established communication channel between the management support software and a destination for the checkpoint based on one or more of a fault detection and/or an escalation of the one application software.

12. The computer-readable medium of claim 2, wherein the manager component makes a determination of a destination for the checkpoint;
   wherein the manager component sends one or more messages to the management support software to set the destination for the checkpoint.

13. The computer-readable medium of claim 12, wherein the destination comprises one or more of memory, a disk storage array, a database, another software component, a console display, and a null destination.

14. The computer-readable medium of claim 12,
   wherein the manager component performs a validation of the destination for the checkpoint;
   wherein the manager component establishes the communication channel upon the validation of the destination for the checkpoint.

15. The computer-readable medium of claim 14, wherein the first software component comprises an active application software component of an active/standby group of application software components;
   wherein the destination comprises a standby software component of the active/standby group of software components;
   wherein the manager component sets up the communication channel between the active application software component and the standby application software component.

16. A computer-readable medium that comprises one or more of a floppy disk, magnetic tape, CD-ROM, DVD-ROM, hard disk drive, or electronic memory that stores a software program for implementation of:

a high availability manager component of a high availability infrastructure for a distributed software application that comprises one or more software components, each comprising application software and management support software, that run within a plurality of executables, said high availability manager component configured to establish communication channels between software components;

a plurality of executable managers for monitoring diagnostics for the plurality of executables;

management support software communication interfaces, associated with each management support software, for receiving messages from the high availability manager component to establish a communication channel with another software component;

an application programming interface between the management support software and the application software in each software component;

a configuration file comprising information about checkpoint relationships between the one or more software components, said configuration file used by the manager component to send a message to at least the management support software of a first software component to establish a communication channel with a second software component such that the checkpoint relationship indicates that the second software component is a checkpoint destination for the first software component; and a code generator, within the management infrastructure, for generating, compiling, and linking code for the management support software based at least on the checkpoint relationship information in the configuration file, wherein the generated code comprises the application programming interface and includes at least a function call interface of the checkpoint procedures for communication between the application software and the management support software in each software component;

wherein one software component of the one or more software components performs a portion of functionality of the distributed software application, wherein a corresponding one management support software of the one software component comprises a portion of the high availability infrastructure;

wherein the high availability manager component and the one management support software cooperate to handle one or more checkpoint procedures for the one application software component.

17. The computer-readable medium of claim 16, wherein the management support software cooperates with the high availability manager component to establish a communication channel between the the first software component and a checkpoint destination;

wherein the management support software receives a checkpoint from the application software through employment of the application programming interface;

wherein the management support software sends the checkpoint to the checkpoint destination through employment of the communication channel established by the management support software in response to a message from the high availability manager component.

18. The computer-readable medium of claim 17, wherein the function call interface comprises functions of the distributed software application for the one or more software components to one or more of save the checkpoint, delete the checkpoint, retrieve the destination for the checkpoint, and set the destination for the checkpoint.

* * * * *